No. 689,262. Patented Dec. 17, 1901.
D. E. WESTON.
NOSE CLIP FOR EYEGLASSES.
(Application filed May 14, 1901.)
(No Model.)
Fig. 1.
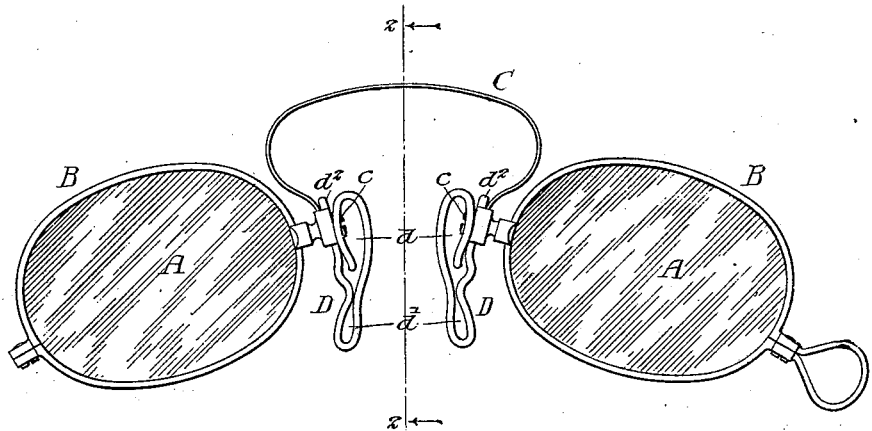
Fig. 2.
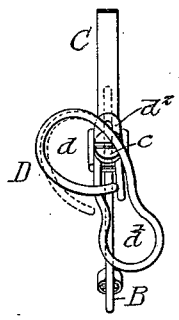
Fig. 3. Fig. 4. Fig. 5.
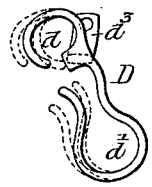  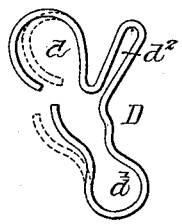
Witnesses:
Louis H. Whitehead.
William E. Bradley
Inventor:
Daniel E. Weston
by his Attorneys:—
Henson & Henson

UNITED STATES PATENT OFFICE.

DANIEL E. WESTON, OF PHILADELPHIA, PENNSYLVANIA.

NOSE-CLIP FOR EYEGLASSES.

SPECIFICATION forming part of Letters Patent No. 689,262, dated December 17, 1901.

Application filed May 14, 1901. Serial No. 60,200. (No model.)

*To all whom it may concern:*

Be it known that I, DANIEL E. WESTON, a citizen of the United States, residing in Philadelphia, Pennsylvania, have invented certain Improvements in Nose-Clips for Eyeglasses, of which the following is a specification.

My invention relates to certain improvements in eyeglasses, and more particularly to improvements in that part of the frame of an eyeglass known as the "nose-clip" or "nose-guard."

It has for its object the provision of a nose-clip which while being adjustable in any direction on the screws which attach it to the bridge of the eyeglasses shall at the same time be capable of being adjusted as to its size and shape, a further object being to provide clips which shall at all times firmly retain a pair of glasses upon the nose of a wearer. These objects I attain as hereinafter set forth, reference being had to the accompanying drawings, in which—

Figure 1 is a front view of a pair of eyeglasses fitted with my improved clips. Fig. 2 is a sectional view on the line 2 2, Fig. 1, showing the shape of one of the nose-clips; and Figs. 3, 4, and 5 are modifications showing some of the forms in which my clip may be made, Fig. 4 being a side view of Fig. 3.

In the drawings, A A are the lenses of a pair of eyeglasses, held in the present instance by rims B B, connected by a bridge-piece C, of any desired construction. At the ends of this bridge-piece headed screws $c\ c$ are provided, which are made to form the attachment for the nose-clips D D. These are preferably constructed of wire, bent to form two loops $d\ d'$ and in the forms shown in Figs. 1, 2, and 3. An end of one of the loops, as $d'$, is bent in and upwardly, forming an elongated U-shaped piece $d^2$, the screws $c\ c$ being made to fit the slot formed by this piece. It will be understood that this piece or projection $d^2$ does not necessarily extend from the loop $d'$, as the clip may with equal advantage be constructed with this piece extending from the upper loop $d$.

If desired, I may attach, by solder or otherwise, a projecting piece $d^3$ to the clip at some point between its two loop portions and use it to connect the clip to the bridge-piece, the ends of both loops having the shape shown in Figs. 3 and 4.

The clips are not necessarily formed or bent out of wire, as they may with equal advantage be stamped from sheet metal by appropriate machinery. When made in this latter manner, they are preferably of the form shown in Fig. 5 and are afterward finished and adjusted to be attached to a bridge-piece and to properly fit a human nose.

It will be seen that by loosening one of the screws $c$ the clip held thereby may be moved up or down, so as to lower or raise the glasses relatively to the eyes of the wearer. By bending in or outwardly the section of the clip connecting the loops $d$ and $d'$ with the bridge-piece the glasses may correspondingly be moved farther from or nearer to the eyes.

As will be understood by those skilled in the art, eyeglasses are ordinarily retained in position on the nose by clips which depend upon pinching or pressure over a limited area of the nose for their holding power. On the other hand, with my improved form of nose-clip but a comparatively light pressure is necessary to retain a pair of glasses in position, for immediately they are placed upon the nose in the desired relation to the eyes the skin rises between the sides of the loops and effectually holds them in place. This does away with the necessity for the common shell or cork protective pieces, which invariably become insecure and slip from perspiration and which, moreover, frequently loosen and require renewal.

The conformation of the small muscles, fascia, and skin, as well as of the nasal bones of the skull which they cover, varies indefinitely, being different in every individual, and it has hitherto been extremely difficult, if not impossible, to easily and comfortably fit glasses to the many varying shapes met with.

As will be apparent from an inspection of my invention, this vital objection has been overcome, as the two curved loops of the said clips lie in different planes, thus presenting a corrugated outline which very nearly approaches in shape the conformation of an average form of human nasal bone. By slightly bending in or out the ends of the loops, as indicated in dotted lines in the figures, the clips may be accurately fitted, and that in a comparatively short time, to any one, the curved outlines causing them to evenly distribute the slight pressure necessary to firmly support the glasses over the correspondingly-shaped parts at the base of the nose. Moreover, it will be observed that the loops bear against the base and side of the nose at bearing points or surfaces separated by a distance substantially equal to the superficial limits of the loops.

I claim as my invention—

1. A nose-guard for eyeglasses having means for attaching it to the frame of the glasses, consisting of a single piece of flexible material having free ends formed into individual loops capable of independent adjustment, substantially as described.

2. A nose-guard for eyeglasses having means for attaching it to the frame of the glasses, said nose-guard consisting of a single piece of wire having formed therein individual loops lying in different planes, and presenting a corrugated outline, each of said loops being capable of independent adjustment, substantially as described.

In testimony whereof I have signed my name to this specification in the presence of two subscribing witnesses.

DANIEL E. WESTON.

Witnesses:
WILLIAM E. BRADLEY,
JOS. H. KLEIN.